United States Patent
Voss et al.

(10) Patent No.: US 10,913,669 B2
(45) Date of Patent: Feb. 9, 2021

(54) CAPACITIVE DE-IONIZATION MINERAL REDUCTION SYSTEM AND METHOD

(71) Applicant: Ecolab USA Inc., St. Paul, MN (US)

(72) Inventors: Peter A. Voss, Eagan, MN (US); Michael R. Ney, Eagan, MN (US); Kyle D. Wood, Eagan, MN (US)

(73) Assignee: Ecolab USA Inc., Saint Paul, MN (US)

( * ) Notice: Subject to any disclaimer, the term of this patent is extended or adjusted under 35 U.S.C. 154(b) by 205 days.

(21) Appl. No.: 15/215,273

(22) Filed: Jul. 20, 2016

(65) Prior Publication Data

US 2018/0022622 A1 Jan. 25, 2018

(51) Int. Cl.
*C02F 1/46* (2006.01)
*C02F 1/469* (2006.01)
(Continued)

(52) U.S. Cl.
CPC .......... *C02F 1/4691* (2013.01); *A47J 31/605* (2013.01); *C02F 1/001* (2013.01); *C02F 1/283* (2013.01);
(Continued)

(58) Field of Classification Search
CPC .................................................. C02F 1/4691
See application file for complete search history.

(56) References Cited

U.S. PATENT DOCUMENTS 5,057,202 A 10/1991 Maitino et al.
6,309,532 B1 * 10/2001 Tran .................. B01J 47/08
204/267

(Continued)

FOREIGN PATENT DOCUMENTS

CA 2828788 A1 9/2012
CN 1863737 A 11/2006
(Continued)

OTHER PUBLICATIONS

Balouch, "Design of Test Loops for Forced Convection Heat Transfer Studies at Supercritical State," Thesis submitted to the Faculty of Graduate Studies and Research at Ottawa-Carleton Institute for Mechanical and Aerospace Engineering, Aug. 2011, 341 pages.

(Continued)

*Primary Examiner* — Stefanie S Wittenberg
(74) *Attorney, Agent, or Firm* — Fredrikson & Byron, P.A.

(57) ABSTRACT

A fluid treatment system is provided, comprising a capacitive deionization (CapDI) system for removing dissolved solids from a fluid. A controller is arranged in a closed feedback loop with the CapDI system to verify whether measured conductivity of the fluid corresponds to a set point conductivity value, and if the measured conductivity of the fluid does not correspond to the set point conductivity value, adjust the operation of the CapDI system to match the set point conductivity value. A pump selectively pressurizes the fluid such that purified fluid is at a pressure greater than line pressure of the fluid treatment system. An accumulator provided downstream of the CapDI system maintains the purified fluid at a pressure greater than the line pressure and intermittently delivers purified fluid to a use device. The purified fluid stored in the accumulator comprising chlorine and or chloramine so as to reduce microbial growth when stored in the accumulator.

17 Claims, 3 Drawing Sheets

(51) Int. Cl.
  *A47J 31/60* (2006.01)
  *C02F 5/00* (2006.01)
  *C02F 1/00* (2006.01)
  *C02F 1/28* (2006.01)

(52) U.S. Cl.
  CPC ............ *C02F 5/00* (2013.01); *C02F 2209/02* (2013.01); *C02F 2209/03* (2013.01); *C02F 2209/05* (2013.01); *C02F 2303/04* (2013.01); *C02F 2303/185* (2013.01); *C02F 2303/22* (2013.01); *C02F 2307/10* (2013.01); *C02F 2307/12* (2013.01)

(56) References Cited

U.S. PATENT DOCUMENTS

| | | | |
|---|---|---|---|
| 6,365,023 | B1 | 4/2002 | De Los Reyes et al. |
| 6,462,935 | B1* | 10/2002 | Shiue .................. B82Y 30/00 |
| | | | 361/511 |
| 6,569,298 | B2 | 5/2003 | Mrida-Donis |
| 6,726,822 | B2 | 4/2004 | Garcia et al. |
| 7,033,481 | B1* | 4/2006 | Schlager ................ C02F 1/008 |
| | | | 204/228.3 |
| 7,481,929 | B2 | 1/2009 | Wilkins et al. |
| 8,557,098 | B2 | 10/2013 | Kim et al. |
| 8,658,043 | B2 | 2/2014 | Wilkins et al. |
| 2004/0121204 | A1 | 6/2004 | Adelman et al. |
| 2005/0103622 | A1 | 5/2005 | Jha et al. |
| 2005/0173262 | A1 | 8/2005 | Nakanishi et al. |
| 2009/0045048 | A1 | 2/2009 | Bourcier et al. |
| 2009/0045074 | A1* | 2/2009 | Hoover ................ C02F 1/4691 |
| | | | 205/687 |
| 2009/0127119 | A1* | 5/2009 | Witte .................... C02F 1/008 |
| | | | 204/662 |
| 2013/0105321 | A1* | 5/2013 | Averbeck ............... B01D 43/00 |
| | | | 204/550 |
| 2013/0118918 | A1* | 5/2013 | Servida ................ C02F 1/4691 |
| | | | 205/744 |
| 2013/0342028 | A1 | 12/2013 | Hermann et al. |
| 2014/0083846 | A1* | 3/2014 | Moon .................... B01D 61/12 |
| | | | 204/274 |
| 2014/0346046 | A1 | 11/2014 | Andelman |
| 2015/0027890 | A1 | 1/2015 | Jha et al. |
| 2015/0298999 | A1 | 10/2015 | Smith et al. |
| 2016/0010222 | A1 | 1/2016 | Jha et al. |
| 2016/0272516 | A1 | 9/2016 | Wood |

FOREIGN PATENT DOCUMENTS

| | | | |
|---|---|---|---|
| JP | 2010058012 A | | 3/2010 |
| WO | 2011121436 A1 | | 10/2011 |
| WO | 2012125637 A2 | | 9/2012 |
| WO | 2013063567 A2 | | 5/2013 |
| WO | 2014014858 A2 | | 1/2014 |
| WO | 2014076557 A1 | | 5/2014 |
| WO | 2015038715 A1 | | 3/2015 |
| WO | WO2015196056 | * 12/2015 | ................ C02F 1/42 |

OTHER PUBLICATIONS

Daigle, "Ultra Deep Water Discharge of Produced Water and/or Solids at the Seabed," Fluor Offshore Solutions, sponsored by the Research Partnership to Secure Energy for America, Apr. 24, 2012, 460 pages.

Cai, "Sensor and Detection Technique Application," Metallurgical Industry Press, Feb. 2013, pp. 138-139, with partial English Translation.

* cited by examiner

CAPACITIVE DE-IONIZATION MINERAL REDUCTION SYSTEM AND METHOD

BACKGROUND

Fluid treatment systems for demineralizing fluids (e.g., water used for providing a treated (e.g., demineralized) fluid supply to various applications such as brewed beverages (e.g., coffee and espresso machines in homes, restaurants, cafés and the like). Such applications may need an instantaneous supply of treated water. Conventional fluid treatment systems typically involve pumping fluids through a reverse osmosis membrane and storing in the treated fluid in a storage tank to meet the demands of a downstream application such as a beverage brewing system. In order to provide relevant information to a user such as total dissolved solids removed by the treatment system, additional monitoring sensors may be required for a typical reverse osmosis system. Further, for a conventional fluid treatment system to continuously maintain a desired conductivity set point (which would correlate to the concentration of total dissolved solids present in the fluid) while the untreated influent water conditions vary, expensive mechanical control equipment or manual adjustment of a blend valve may be required to continuously tune the water quality with volumes of untreated water.

Moreover, reverse osmosis membranes used in typical fluid treatment systems are damaged by residual sanitizer comprising chlorine and/or chloramine present in typical municipal waters passing through the membranes. As a result, the sanitizer is removed from fluid prior to passage through the reverse osmosis membranes. If the fluid purified by the reverse osmosis membranes are stored for use by a downstream application for extended periods of time (e.g., in a tank in a coffee brewer), the absence of chlorine or other sanitizers may permit microbial growth.

SUMMARY

In general, certain embodiments of the present disclosure is directed to a fluid treatment system, comprising a capacitive deionization (CapDI) system for removing dissolved solids from a fluid passing therethrough. The fluid treatment system includes a conductivity sensor positioned downstream of the CapDI system for measuring conductivity of the fluid after passing through the CapDI system. A controller is arranged in a closed feedback loop with the CapDI system to verify whether measured conductivity of the fluid downstream of the CapDI system corresponds to a set point conductivity value, and if the measured conductivity of the fluid does not correspond to the set point conductivity value, the controller automatically adjusts the operation of the CapDI system to match the set point conductivity value.

In some embodiments, the capacitive deionization (CapDI) system is operable between a purify cycle and a waste cycle, wherein, in the purify cycle, the CapDI system is configured to remove dissolved solids from a fluid flowing therethrough so as to provide purified fluid downstream of the CapDI system, and in the waste cycle, the CapDI system is configured to release removed dissolved solids in the purify cycle into a waste stream.

In some embodiments, the fluid treatment system comprises a pump fluidly connected to and provided upstream of the CapDI system, such that during the waste cycle, the fluid treatment system is maintained at a line pressure corresponding to pressure of the fluid upstream of the pump, and during the purify cycle, the pump is configured to pressurize the purified fluid to be at a pressure greater than the line pressure.

In some embodiments, the fluid treatment system comprises an accumulator fluidly connected to and provided downstream of the CapDI system to maintain purified fluid at a pressure greater than the line pressure and intermittently deliver purified fluid to the use device.

In some embodiments, the purified fluid stored in the accumulator comprises residual sanitizer so as to reduce microbial growth when stored in the accumulator. As used herein, residual sanitizer may include chlorine and/or chloramine.

The details of one or more examples are set forth in the accompanying drawings and the description below. Other features, objects, and advantages will be apparent from the description and drawings, and from the claims.

DETAILED DESCRIPTION

Figure 1:
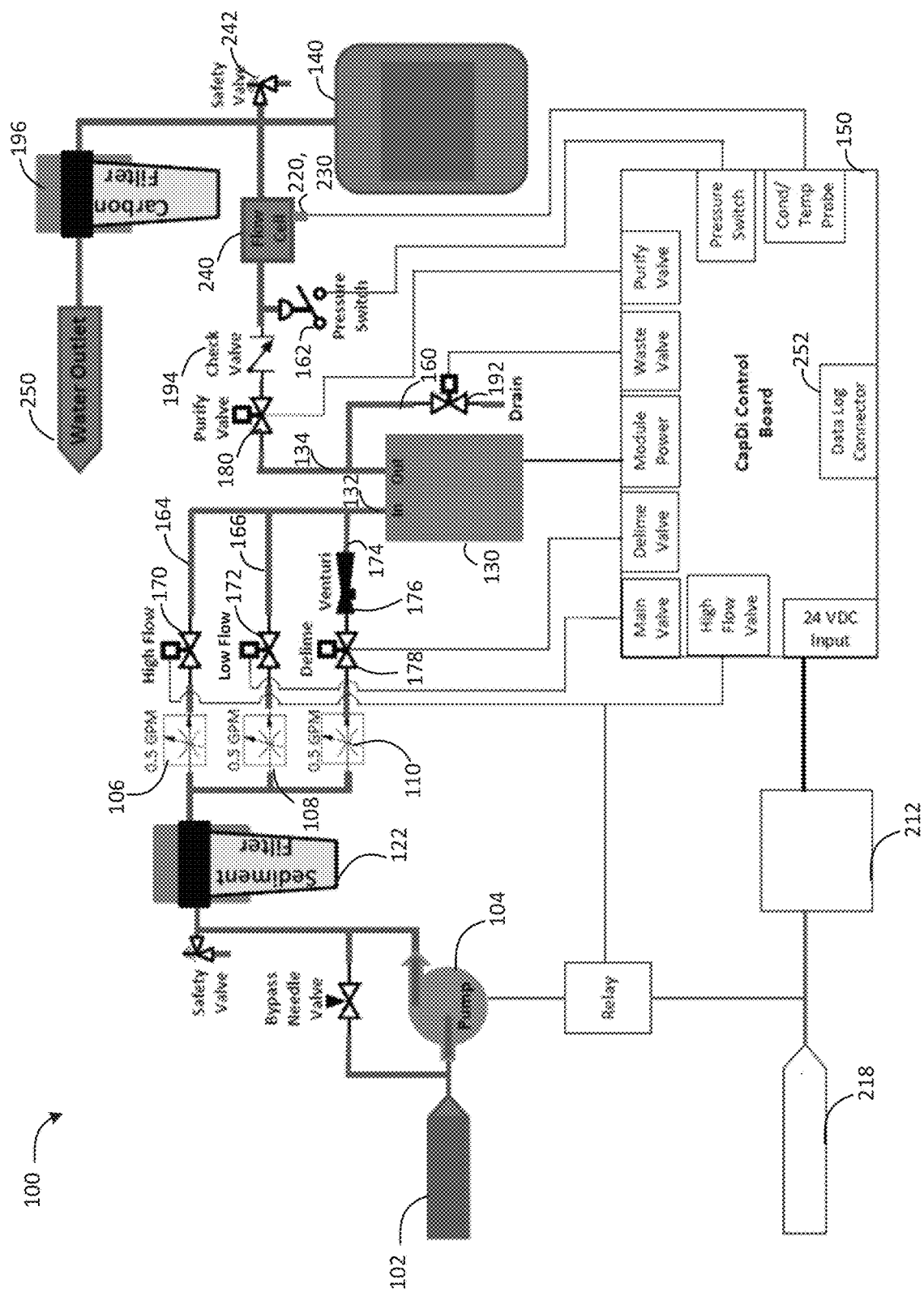
FIG. 1 is a schematic diagram of an exemplary fluid treatment system according to some embodiments.

The present disclosure relates to a fluid treatment system 100 for treating fluid and providing purified fluid supply to various downstream applications such as beverage brewing (coffee or espresso machines), commercial steamers, ovens and the like. FIG. 1 illustrates a schematic of the fluid treatment system 100 according to an embodiment. As seen in FIG. 1, the fluid treatment system 100 comprises a supply inlet 102 for receiving a fluid. The supply inlet 102 can be fluidly coupled to a cold fluid line (not shown) for receiving a fluid from a source. In general, the supply inlet 102 can receive a fluid from any source (e.g., a municipal water supply line) appropriate for the desired use of the fluid. The fluid treatment system 100 may include flow components such as a pump 104 for maintaining adequate fluid pressure, flow metering devices 106, 108, 110, with corresponding valves, valve control mechanism and filters 122. The fluid flows through one or more of the above-mentioned flow components and enters a capacitive deionization (CapDI) system 130 for removing solids from the fluid passing therethrough. The CapDI system 130 comprises a fluid inlet 132 for receiving unpurified fluid from the supply inlet 102, through one or more flow components, and a fluid outlet 134 for supplying purified fluid to an accumulator 140 for storing purified fluid. The accumulator 140 (sometimes referred to as a "bladder tank") is provided upstream of a use device 250 (e.g., a coffee brewer or an espresso machine) to store purified fluid so that sudden or instantaneous demands in a supply of purified fluid from the use device 250 can be easily met by the fluid treatment system 100. A controller 150 is electrically coupled to various components of the fluid treatment system 100 to send and receive signals. A waste line 160 is connected to the CapDI system 130 for flushing fluids (e.g., to drain ions from the CapDI system 130) into a drain (not shown).

The fluid treatment system 100 according to FIG. 1 can be operated in either a purify cycle or a waste cycle. In the purify cycle, the CapDI system 130 is configured to remove dissolved solids from the fluid flowing therethrough so as to provide purified fluid downstream of the CapDI system 130, and in the waste cycle, the CapDI system 130 is configured to release removed dissolved solids in the purify cycle into a waste stream, through the waste line 160.

Referring again to FIG. 1, in some embodiments, the pump 104 provided upstream of the CapDI system 130 can selectively pressurize the fluid based on whether the system is operating in the purify cycle or the waste cycle. For instance, during the waste cycle, the fluid treatment system 100 can be maintained at a line pressure (e.g., atmospheric pressure) corresponding to pressure of the fluid upstream of the pump 104. During the purify cycle, the pump 104 can pressurize the purified fluid to be at a pressure greater than the line pressure. In one example, the pump 104 is a rotary vane pump 104 having a 50 gallon per hour flow capacity and is electrically coupled to the controller 150. In such cases, the pump 104 speed can be adjusted by the controller 150 to operate the pump 104 at a desired speed, resulting in a predetermined fluid pressure of the purified fluid. The controller 150 may optionally switch the pump 104 off during the waste cycle and switch it on again during a subsequent purify cycle. Such embodiments allow the fluid treatment system 100 to be operated with minimal fluid and electrical power consumption, thereby improving the efficiency of the overall system.

As mentioned above, the fluid treatment system 100 comprises an accumulator 140 for storing purified fluids to meet instantaneous demands from the use device 250. In one example, the accumulator 140 is an Amtrol RO14 bladder tank having a capacity of about 14 gallons. The accumulator 140, as seen in FIG. 1 is fluidly connected to and provided downstream of the CapDI system 130. As such, the accumulator 140 stores pressurized (and purified) fluid so as to maintain the purified fluid at a pressure greater than the line pressure, the accumulator 140 includes a bladder (e.g., a flexible membrane) that can act as a partition between fluid received from the CapDI system 130 and a pressurized gas (e.g., air). As such, the pump 104 is operated during the purify cycle to pressurize purified fluid from the CapDI system 130 as it flows into the accumulator 140. As the volume of purified fluid received in the accumulator 140 increases, the gas is pressurized. However, once the purify cycle is completed, the pump 104 may be switched off (e.g., by the controller 150), but the pressurized gas helps maintain the pressure of the purified fluid in the accumulator 140. Such embodiments facilitate meeting instantaneous demand of purified fluid in a use device 250.

Continuing with the above-example, a pressure switch 162 can be operatively connected to the accumulator 140 to maintain the pressure of the purified fluid in the accumulator 140 to be greater than a predetermined minimum pressure and below a predetermined maximum pressure. A seen in FIG. 1, the pressure regulator 162 is configured to communicate with the controller 150 (e.g., via electrical connections) such that if the pressure of purified fluid in the accumulator 140 is below the predetermined minimum pressure, the controller 150 signals the pump 104 to further pressurize fluid entering the accumulator 140, and if the pressure of purified fluid in the accumulator 140 is above the predetermined maximum pressure, the controller 150 signals the pump 104 to stop pressurizing fluid entering the accumulator 140.

In an exemplary embodiment, the predetermined minimum pressure can be about 30 psi, and the predetermined maximum pressure can be about 60 psi. Accordingly, the pressure switch 162 can communicate with the controller 150 if the pressure in the accumulator 140 has dropped below 30 psi or has exceeded 60 psi. In such cases, the controller 150 communicates with the pump 104 to increase the pressure of the fluid flowing therethrough to achieve an accumulator 140 pressure of at least 30 psi, or stop pressurizing the fluid if the pressure in the accumulator 140 is greater than 60 psi. The pressures described herein are exemplary to a specific volumetric capacity of the accumulator and should not be construed as limiting. As is apparent to one skilled in the art, other pressures to accommodate larger or smaller capacity accumulators are within the scope of the present disclosure.

In some embodiments, the CapDI system 130 is configured to selectively receive fluid at a desired flow rate based on whether the system is operated in the purify cycle or the waste cycle. In such cases, with continued reference to FIG. 1, the fluid inlet 132 of the CapDI system 130 can be fluidly coupled to a first flow line 164 and a second flow line 166. The first flow line 164 and second flow line 166 can both be downstream of a sediment filter 122 and upstream of the fluid inlet 132 of the CapDI system 130. The first flow line 164 and second flow line 166 can each comprise flow metering devices 106, 108 respectively (e.g., orifice plate or other flow restrictors) to permit a desired flow rate of fluid therethrough. The flow metering devices of the first flow line 164 and the second flow line 166 can be chosen so that the flow rate of unpurified fluid through the first flow line 164 and a flow rate of unpurified fluid through the second flow line 166 can both be adjusted to provide a higher flow rate through the CapDI system in the purify cycle than during the waste cycle. In such cases, the CapDI system may receive a higher amperage during the waste cycle than during the purify cycle to accommodate the lower flow rate of fluid.

For instance, in the illustrated exemplary embodiment, the flow metering devices 106, 108 can each supply the same flow rate of fluid (e.g., each supplying 0.5 gallons per minute) therethrough. In such cases, the controller 150 may keep both the first solenoid valve and the low flow valve to be open during the purify cycle to provide about 1.0 gallon per minute to the CapDI system 130, but close the first solenoid valve during the waste cycle to reduce fluid requirements (e.g., water consumption). Accordingly, in the waste cycle, the fluid flows through the second flow line 166 at a rate of about 0.5 gallons per minute. The flow rates described herein are exemplary to a specific volumetric capacity of the accumulator and should not be construed as limiting. As is apparent to one skilled in the art, other flow rates to accommodate larger or smaller capacity accumulators are within the scope of the present disclosure.

Continuing with the exemplary embodiment above, a first solenoid valve 170 is fluidly coupled to the first flow line 164 and electrically coupled (e.g., via a valve control mechanism) to the controller 150, and a second solenoid valve 172 fluidly coupled to the low flow line 166 and electrically coupled (e.g., via a valve control mechanism) to the controller 150. The first solenoid valve 170 and the second solenoid valve 172 can be on/off valves (e.g., 24 Volts DC valves). The controller 150 may signal the valve control mechanism to open the first solenoid valve 170 to supply unpurified fluid through the first flow line 164 during the purify cycle but not during the waste cycle. Further, the controller 150 may signal the valve control mechanism to open the second solenoid valve 172 to supply unpurified fluid through the second flow line 166 during the purify cycle. In the waste cycle, the second solenoid valve 172 is open, whereas the first solenoid valve 170 is not open. Accordingly, the CapDI system 130 receives a higher flow rate of fluid during the purify cycle (through the first flow line 164) than during the waste cycle. Such embodiments allow the fluid treatment system 100 to be operated with minimal fluid waste.

Alternatively, the first flow line 164 and second flow line 166 can have flow components (e.g., restrictors, valves and the like) that permit a greater flow rate through one of the two first and second flow lines 164, 166, and/or be selectively opened or closed such that the CapDI system receives a higher flow rate during the purify cycle than during the waste cycle.

In some embodiments, the fluid treatment system 100 comprises a de-scaling line 174 fluidly coupled to the CapDI system 130. The de-scaling line 174 can be used periodically to flush any residual scale build-up in the CapDI system 130. In an exemplary embodiment, a descale product (e.g., solvents or chemicals that can dissolve scale or lime buildup) can be aspirated into water flowing through the descale line 174, through a venturi 176 and into the CapDI system 130. The flow rate of water through the descale line 174 can be about the same as the flow rate of water through the second flow line 166 during the waste cycle. In the illustrated embodiment, the descale line 174 can provide about 0.5 gallons per minute of fluid. Such embodiments can improve the efficiency of operation of the system by reducing fluid requirements (e.g., water consumption) for routine clean-up of the system. Further, the descale cycle can be automatically accomplished by the controller 150 in periodic intervals (e.g., every two weeks, once a month, etc.) without any user intervention. The controller 150 can, for instance, open a descale valve 178 once a certain interval of time has passed, to perform a descale cycle. The controller 150 may close the high flow and the low flow valve while descale operation is being performed. Further, controller 150 may close downstream valves (e.g., purify valve 180) but keep the drain valve 192 of the waste line 160 open to flush out water and/or descale product. A check valve 194 may reduce any reverse flow into the CapDI system. The flow rates described herein are exemplary to a specific volumetric capacity of the accumulator and should not be construed as limiting. As is apparent to one skilled in the art, other flow rates to accommodate larger or smaller capacity accumulators are within the scope of the present disclosure.

In some embodiments, the purified fluid stored in the accumulator 140 comprises residual sanitizer. As mentioned previously, the residual sanitizer may include chlorine and/or chloramine so as to reduce microbial growth when stored in the accumulator 140. For instance, as seen in FIG. 1, one or more selective filters are provided upstream of the CapDI system 130. In the illustrated embodiment, the selective filters comprise a gradient density polypropylene sediment filter that can selectively filter 122 out particulates (e.g., of size 0.5-1 μm) from unpurified water flowing toward the CapDI system 130. The sediment filter 122 can, however, permit passage of residual sanitizer there through, such that water entering the CapDI system 130 has residual sanitizer dissolved in it. The CapDI system 130 may further retain residual sanitizer present in water, such that when purified water (e.g., without any dissolved solids) leave the CapDI system 130, it may still have residual sanitizer in it. Residual sanitizer may also be present in the water stored in the accumulator 140, such that microbial growth (e.g., *E. coli*) may be reduced. In such cases, one or more downstream filters 196 can be provided downstream of the accumulator 140 and upstream of the use device 250, which can filter out chlorine from the purified fluid flowing out of the accumulator 140 so as not to impart an off taste or odor to a beverage or induce corrosion to a steamer or oven.

Figure 2A:
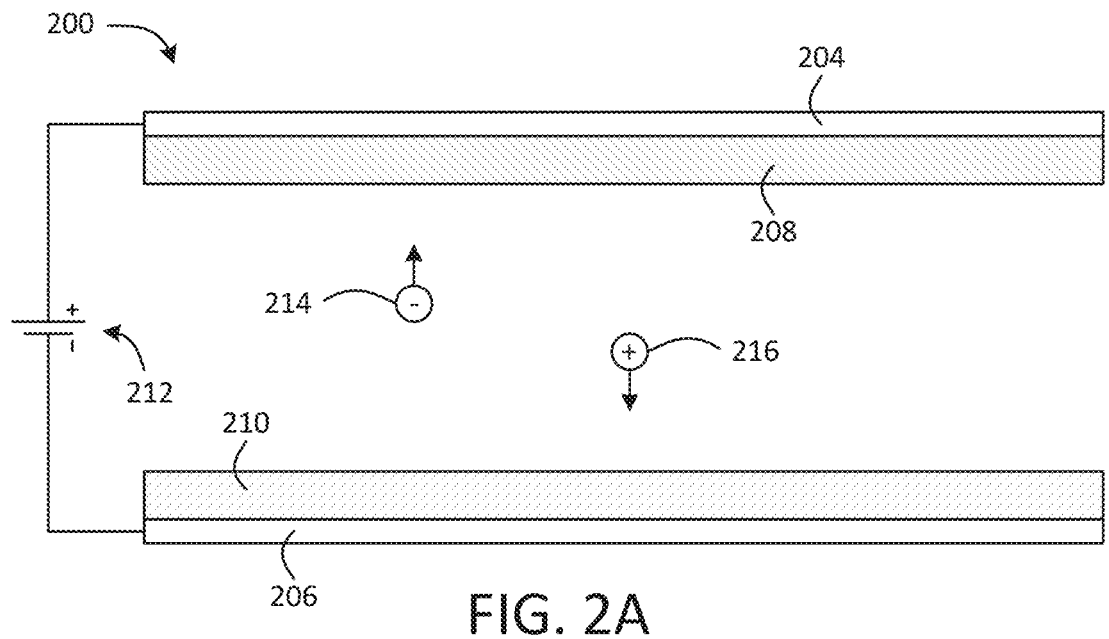
FIG. 2A is an exemplary schematic of a basic CapDI cell operating in a purify cycle.
Figure 2B:
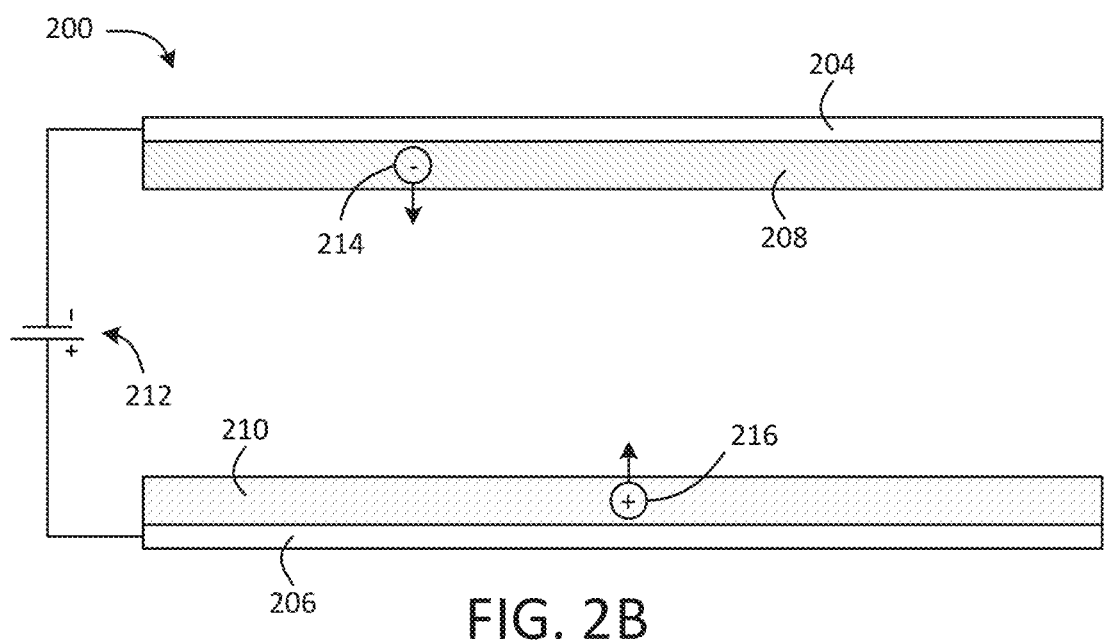
FIG. 2B is an exemplary schematic of a basic CapDI cell operating in a waste cycle.

Referring back to FIG. 1, in some embodiments, the CapDI system 130 used herein can be substantially similar to the CapDI system 130 are provided in the commonly-assigned U.S. application Ser. No. 15/059,968, the disclosure of which is hereby incorporated by reference in its entirety. An example of such a CapDI system 130 is a commercially available CapDI module. As described therein, and referring now to FIGS. 2A and 2B, the CapDI system 130 comprises a plurality of CapDI cells (arranged in series or parallel configuration). An example CapDI cell 200 is shown in FIGS. 2A and 2B, comprising electrodes 204, 206 configured to receive electrical power and permit ion migration between the CapDI cell 200 and the fluid passing therethrough. In FIG. 2A, the CapDI system 130 is used in a purify cycle, whereby, a charge is provided to opposing capacitive surfaces 208, 210 and from an electrical source 212. The electrical source 212 is shown as being a DC source, however, in various embodiments, more complicated power source arrangements can be used. In the illustrated example, a first capacitive surface 208 is held at a positive charge with respect to a second capacitive surface 210. When the charge is applied across the surfaces, a negatively charged ion 214 in a fluid therebetween will migrate toward the first capacitive surface 208 (the more positive surface), while a positively charged ion 216 in the fluid will migrate toward the second capacitive surface 210 (the more negative surface), as illustrated by the arrows in FIG. 2A.

In some embodiments, the first and/or second capacitive surfaces of the CapDI cell 200 may comprise a porous material or porous layers for trapping ions attracted to the respective capacitive surfaces. In some embodiments, the surface for trapping ions comprises a membrane that selectively allows ions with charge of a certain polarity to pass therethrough. As ions migrate through the fluid to respective capacitive surfaces, current flows through the fluid. Accordingly, current flowing to/through the capacitive surfaces and the CapDI system 130 is indicative of the number of ions being removed from the fluid.

Over time and with use, the components of the CapDI system 130 that trap ions therein (e.g., porous capacitive surfaces or other porous layers) can become saturated with ions. Accordingly, it can be desirable to be able to rid such components of ions in order to regenerate the CapDI module in a waste cycle as illustrated in FIG. 2B. With reference to FIG. 2B, if the polarity of the power source were reversed, a negative ion will be repelled away from the first capacitive surface 208 (the more negative surface) and into the fluid, while a positive ion will be repelled away from the second capacitive surface 210 (the more positive surface) and into the fluid. Thus, if fluid is flushed through the CapDI system 130, previously trapped ions will be flushed therefrom into a waste fluid stream, creating room for the further demineralization of fluid. The controller 150 can keep the drain valve 192 open so that the waste stream may flow through the waste line 160.

Referring back to FIG. 1, and as described above, the exemplary CapDI system 130 includes a source of electric power to effectively capture ions from a fluid flowing therethrough. As such, the fluid treatment system 100 includes a power supply line 218 for providing electrical power from the electrical source 212 to the CapDI system 130. The power supply line 218 can provide a specified amount of voltage and/or current to the CapDI system 130. The power supply line 218 is connected to the controller 150, which in turn is electrically connected to the CapDI system 130 for controlling the amount of voltage and/or current supplied to the CapDI system 130.

With continued reference to FIG. 1, in some embodiments the controller 150 can be included on a control board (e.g., a printed circuit board). The controller 150 can include, for example, a microcontroller or other device 250 capable of receiving signals and outputting signals based on the received signals. In some configurations, controller 150 is sized such that it can be positioned on a control board. In some embodiments, controller 150 can be in communication with several components of the control board and control various components of the fluid treatment system 100 as will be described further below.

In some embodiments, the controller 150 is arranged as a closed feedback loop with the CapDI system 130. In such embodiments, one or more sensors arranged at various fluid lines in the fluid treatment system 100 can measure fluid properties. The measured fluid properties can be transmitted to the controller 150. The controller 150 can send signals to the CapDI system 130 (or other components) to adjust the operation of the fluid treatment system 100 until a desired value of a fluid property is reached.

In one example, the fluid treatment system 100 includes a conductivity sensor 220 positioned downstream of the CapDI system 130 for measuring conductivity of fluid after passing through the CapDI system 130, and a temperature sensor 230 for measuring fluid temperature. The conductivity sensor 220 can be of a type and construction that can measure conductivity of potable water with sufficient accuracy and precision. In such cases, the closed-loop feedback arrangement of the controller 150 and the CapDI system 130 permits verification of whether measured conductivity of fluid downstream of the CapDI system 130 corresponds to a set point conductivity value, and if the measured conductivity of fluid does not correspond to the set point conductivity value, adjust the operation of the CapDI system 130 to match the set point conductivity value. As described above, fluid conductivity may correlate to the amount of ions or total dissolved solids present in the fluid, and as such can be used to determine whether the CapDI system 130 is purifying the fluid to a satisfactory extent. As is apparent to one skilled in the art, conductivity is typically a function of fluid temperature, and measurement of conductivity as well as temperature advantageously allows the fluid treatment system 100 to determine whether the system is operating at a given set point conductivity value at a given temperature.

Continuing with the foregoing example, the set point conductivity value may correspond to a predetermined conductivity of a fluid, and in turn, correlate to a predetermined concentration of impurities in the fluid. For instance, in one example, a conductivity of 206 μS may correspond to about 130 parts per million (ppm) of total dissolved solids in water. In some cases, the set point conductivity value may be set by a user according to the needs of a downstream application, such as a beverage brewing system. In such cases, the conductivity sensor 220 can measure the conductivity of fluid leaving the CapDI system 130 each time the CapDI system 130 is used to purify fluid flowing therethrough. Thus, the conductivity sensor 220 is configured to measure conductivity of fluid intermittently at desired intervals (e.g., after a purify cycle is completed).

Referring again to FIG. 1, the fluid treatment system 100 comprises a flow cell 240 positioned downstream of the CapDI system 130 and upstream of a use device 250 (e.g., a coffee brewer or an espresso machine). In such cases, once the purify cycle is completed, the purified fluid flows into and is collected in the flow cell 240 during a sampling interval. Once the fluid is collected at the end of the sampling interval, the conductivity sensor 220 measures the conductivity of purified fluid and communicates with the controller 150 to send the measured value of conductivity. The controller 150 may then compare the measured fluid conductivity to a set point conductivity value to determine if the measured conductivity of the fluid equals the set point conductivity value. If the measured conductivity does not equal the set point conductivity value, it may indicate that the CapDI system 130 is not operating at the desired set point conductivity value. The controller 150 may communicate with various components of the fluid treatment system 100 to adjust their operation until the measured conductivity of the fluid matches the set point conductivity value.

In one example, the measured conductivity of the fluid downstream of the CapDI system 130 may exceed the set point conductivity value. Such a condition may correspond to a state when the CapDI has not removed an adequate concentration of ions or dissolved solids or a situation where the upstream concentration of dissolved solids has increased or is variable. In such cases, the controller 150 may communicate with the CapDI system 130 to facilitate removal of more ions/dissolved solids from the fluid during the purify cycle. In one example, this may be accomplished by regulating current applied to the CapDI system 130. For example, the current may be increased to reach a desired voltage set-point. A desired concentration of ions may be removed once the voltage set-point is achieved. In other alternative embodiments, various other operating parameters can be adjusted so as to achieve operation of the system at the set point conductivity value. For example, the controller may adjust the flow rate through the CapDI system can be regulated to reach a flow rate set-point. A desired concentration of ions may be removed once the flow rate set-point is achieved.

Certain embodiments of the present disclosure also permit using the fluid treatment system 100 in conjunction with the Internet of Things (also known as "IoT") to facilitate remote monitoring of processes that use the fluid treatment system 100. The IoT allows physical objects to be sensed and controlled remotely across existing network infrastructure, permitting better integration between the physical world and computer-based systems, and resulting in improved efficiency, and accuracy. As is apparent to one skilled in the art, the IoT, provides a network of physical objects such as, sensors and control electronics, with network connectivity and software to enable such physical objects to exchange data with connected devices (e.g., belonging to a user, an operator, or a manufacturer). The IoT is frequently based on infrastructure available under the International Telecommunication Union's Global Standards Initiative. In such embodiments, each physical object is uniquely identifiable through its embedded computing system but is able to interoperate within the existing Internet infrastructure. Communications may comprise systems and methods known in the art, such as transport layer security ("TLS"), fast simplex link ("FSL"), data distribution service ("DDS"), hardware boot security, device firewall, application security to harden from malicious attacks, self-healing/patching/firmware upgradability, and the like. Security may be further included by use of at least one of obfuscation of data transmission, hashing, cryptography, PKI, secured boot access, and the like.

In IoT, it has been proposed that future versions of these so-called 'background' electronic devices be outfitted with more powerful computing capabilities and networking, subsystems to facilitate wired or wireless communication. For example, the background electronic devices may include a cellular network interface (LTE etc.), a wireless local area network interface (e.g., a wireless network such as described in the Institute of Electrical and Electronics Engineers (IEEE) 802.11 standard or Bluetooth™ from the Bluetooth Special Interest Group of Kirkland, Wash.), and/or another type of wireless interface (such as a near-held-communication interlace). These capabilities may allow the background electronic devices to be integrated into information networks. In certain embodiments of the present invention, it is understood that elements of the current electronic system be integrated into or formed into IoT. Accordingly, it should be understood that components of the fluid treatment system 100 described herein may be formed into or part of an IoT system to provide an end user, a manufacturer or an operator the ability to visualize data (e.g., conductivity set point, total dissolved solids removed, temperature, accumulator pressure and the like), as well as control various parameters (e.g., conductivity set point, predetermined minimum and maximum pressures of the accumulator and the like) to effectively adjust the desired outcome (e.g., water quality, and the like).

Example

In one example, the fluid treatment system 100 illustrated in FIG. 1 can be used to purify water so that the concentration of total dissolved solids is below about 130 ppm, corresponding to a conductivity of purified water of about 206 µS. The system was operated for about 3 hours and 45 minutes. Inlet water conditions corresponded to about 17 grains per gallon hardness and about 350 ppm of total dissolved solids. The water supply was switched half-way through the operation to provide softened water with about 0 grains per gallon hardness and about 350 ppm of total dissolved solids and to measure the dynamic responsiveness of the fluid treatment system 100 to handle water of different inlet conditions. The pump 104 was a 50 gallon per hour rotary vane pump.

During the purify cycle, the controller 150 maintained the first solenoid valve and the low flow valve open during the purify cycle to provide a flow rate of about 1 gallon per minute. The accumulator 140 had a water capacity of about 14 gallons. The pressure in the accumulator 140 was maintained between about 30 psi and about 60 psi. A safety valve 242 was provided on the accumulator 140 to relieve excess pressure build-up in the accumulator 140. The controller 150 automatically adjusts various parameters (e.g., voltage supplied to the CapDI system 130, flow rate, valves open) so that the conductivity of purified water matches the set point conductivity value. A downstream carbon filter removed chlorine present in the accumulator 140 prior to supplying it to the use device 250. During the waste cycle, the controller 150 closed the first solenoid valve so that a flow rate of about 0.5 gallon per minute was provided. The current flow to the CapDI system 130 was greater in the waste cycle than in the purify cycle. The purify cycle lasted about 73 seconds, and the waste cycle lasted about 40 seconds.

Figure 3:
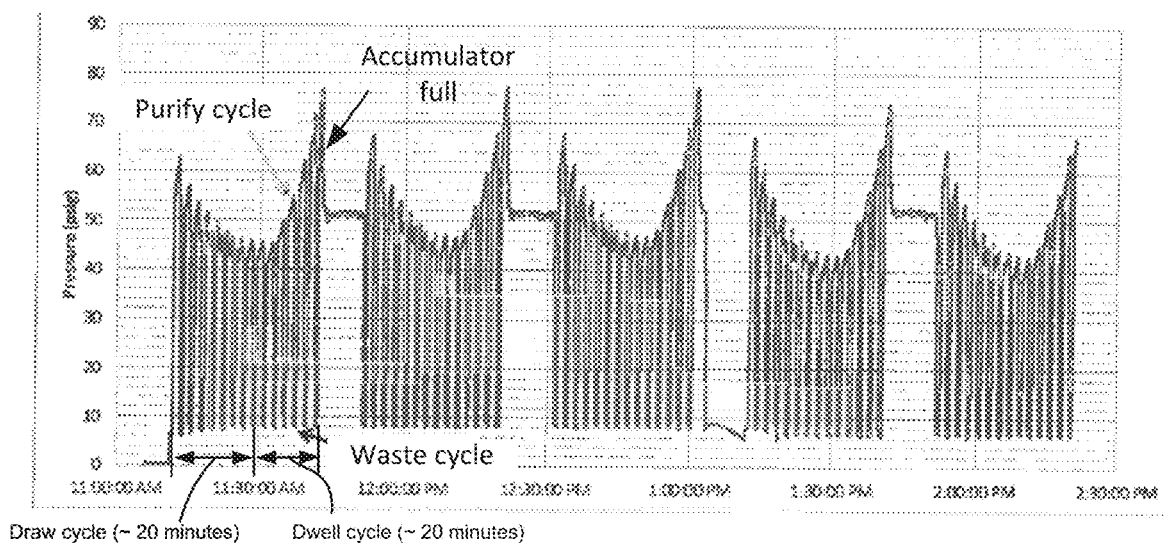
FIG. 3 is a graph illustrating pressure in the fluid treatment system during use according to an example.

FIG. 3 provides a graph of pressure in the fluid treatment system 100 during operation. During this operation, water is drawn from the accumulator tank in 20-minute cycles separated by a 20-minute dwell time. The static line pressure was about 50 psig. The pump 104 was operated during the purify cycle to pressurize the accumulator to a pressure greater than about 30 psig (predetermined minimum pressure) but not exceeding about 60 psig (predetermined maximum pressure). However, during the waste cycle, the pump 104 operation was stopped and the drain valve 192 was opened, resulting in the pressure dropping to a dynamic pressure of about 8 psig. As purified water is drawn from the accumulator for 20 minutes, its pressure decreases as the volume of water in the accumulator decreases (e.g., as a result of depressurizing the bladder in the accumulator). The 20-minute draw cycle from the accumulator is followed by a dwell time of 20 minutes, during which no more purified water is discharged from the accumulator and the system continues supplying pressurized fluid into the accumulator until the accumulator reaches its predetermined maximum pressure of 60 psig. Once the accumulator reaches its predetermined maximum pressure, the system remains idle at the static line pressure of 50 psig until the next 20 minute draw cycle begins A pre-purify cycle was performed with the same parameters as the purify cycle (e.g., 1 gallon per minute, polarity of the CapDI cells opposite to the polarity during the waste cycle, lower amperage than the waste cycle) for about 7 seconds, but instead of supplying the water to accumulator 140 as is done at the end of the purify cycle, the water flowing out the CapDI system 130 in the pre-purify cycle is sent to the waste line 160 to flush any residual concentrated fluid.

Figure 4:
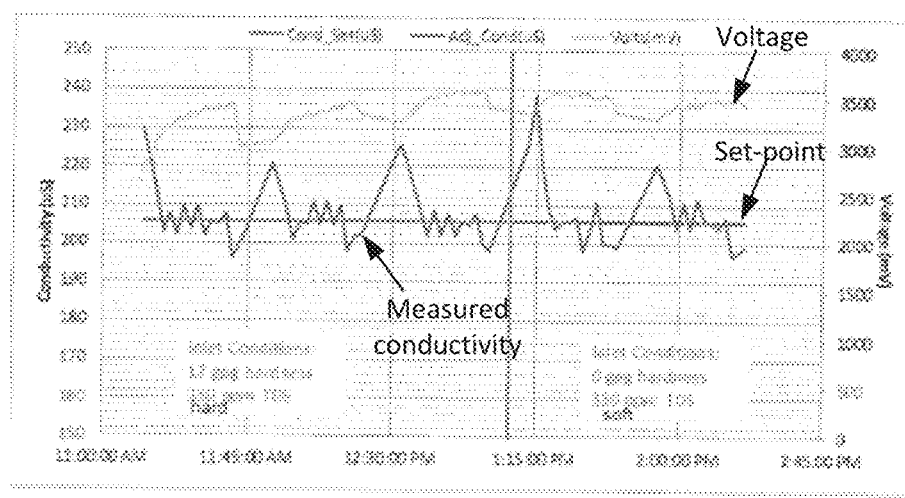
FIG. 4 is a graph illustrating conductivity measured by the conductivity probe during use of the fluid treatment system according to an example.

FIG. 4 provides a graph of conductivity measurements of this example. The conductivity of the purified water corresponding to both hard and soft water varied between about 198 µS and about 240 µS, providing a consistent water quality despite changing the water source at the supply inlet 102 to softer water. The voltage curve in FIG. 3 illustrates dynamic response of the controller 150 to measured conductivity, so as to adjust the voltage supplied to the CapDI system 130 so as to maintain a consistent water quality, nominally around the conductivity set point at 206 µS. In this example, purified water stored in the accumulator 140 was emptied in about 20 minutes. A data log connector 252 provided on the controller facilitated monitoring, storing, processing and displaying measured conductivity and other system parameters in a graphical user interface.

Exemplary embodiments of the fluid treatment system disclosed herein can provide one or more advantages. The system according to some embodiments may provide automatic adjustment of system parameters and a closed-loop feedback operation of the CapDI system to verify that target values of conductivity (and corresponding water quality) are achieved. Such systems also facilitate connecting the CapDI system to a user-interface (via data log connector) to monitor, store, analyze and display data corresponding to historical operation (e.g., parameters such as conductivity, temperature, voltage/current, pressure, flow rate, and the like) of the CapDI system. Further, the system is operated at a higher efficiency due to lower water consumption during the waste cycle. Moreover, unlike reverse osmosis fluid treatment systems, the CapDI system can operate when chlorine is present in the incoming water stream. As a result, when purified water is stored for subsequent use, microbial growth is reduced.

Various examples have been described. These and other examples are within the scope of the following claims.

The invention claimed is:

1. A fluid treatment system, comprising:
a capacitive deionization (CapDI) system for removing dissolved solids from a fluid passing therethrough,
a supply inlet;
the CapDI system comprising:
  a plurality of CapDI cells, each comprising electrodes configured to receive electrical power and permit ion migration between the CapDI cells and the fluid passing therethrough; and
  a first fluid inlet for receiving fluid from the supply inlet;
a conductivity sensor positioned downstream of the CapDI system for acquiring conductivity data representative of the conductivity of the fluid after passing through the CapDI system;
an accumulator positioned downstream of the CapDI system and configured to receive fluid from the CapDI system, wherein
the accumulator and CapDI system are positioned upstream of an outlet and fluidly connected to the outlet, the outlet provides fluid to a device that uses the fluid, and both the CapDI system and the accumulator are configured to supply fluid to the outlet;
a controller operatively connected to the CapDI system, the controller being arranged as a closed feedback loop with the CapDI system, and configured to:
  receive the conductivity data from the conductivity sensor;
  determine whether the measured conductivity of the fluid downstream of the CapDI system corresponds to a set point conductivity value; and
  adjust the operation of the CapDI system in a manner such that the measured conductivity will more closely match the set point conductivity value, the operation of the CapDI system comprising a purify cycle and a waste cycle;
a first flow line, the first flow line positioned upstream of the CapDI system and downstream of the supply inlet, the first flow line being configured to provide fluid from the supply inlet to the first fluid inlet of the CapDI system at a first flow rate;
a first valve, the first valve fluidly coupled to the first flow line and electrically coupled to the controller;
a second flow line, the second flow line positioned upstream of the CapDI system and downstream of the supply inlet, the second flow line being configured to provide fluid from the supply inlet to the first fluid inlet of the CapDI system;
a second valve, the second valve fluidly coupled to the second flow line and electrically coupled to the controller; and wherein
the controller further configured to:
  in the purify cycle:
    keep the first valve open to provide the CapDI system with the first flow rate;
    keep the second valve open to additionally provide the CapDI system with a second flow rate; and
    operate the CapDI system, such that the CapDI system is configured to remove dissolved solids from the fluid flowing therethrough so as to provide the purified fluid downstream of the CapDI system; and
  in the waste cycle:
    keep the first valve open to provide the CapDI system with the first flow rate;
    keep the second valve closed such that the CapDI system is not provided with the second flow rate; and
    operate the CapDI system, such that the CapDI system is configured to remove dissolved solids from the fluid flowing therethrough so as to release removed dissolved solids from the purify cycle into a waste stream.

2. The fluid treatment system of claim 1, wherein the controller is configured to adjust the operation of the CapDI system by regulating the current applied to the CapDI system.

3. The fluid treatment system of claim 1, wherein the conductivity sensor is configured to measure conductivity of the fluid intermittently.

4. The fluid treatment system of claim 3, wherein the conductivity sensor is configured to measure conductivity of the fluid at the end of each purify cycle.

5. The fluid treatment system of claim 1, further comprising a flow cell for permitting measurement of conductivity of the purified fluid using the conductivity sensor.

6. The fluid treatment system of claim 5, wherein the controller is configured to acquire conductivity measurements of the fluid received in the flow cell at the end of a sampling interval, wherein the sampling interval corresponds to a time interval when the flow cell collects purified fluid.

7. The fluid treatment system of claim 1, wherein the accumulator is configured to supply fluid to the outlet during sudden or instantaneous demands in a supply of fluid from the device.

8. The fluid treatment system of claim 1, wherein the fluid comprises a residual sanitizer having chlorine and/or chloramine sanitizer; and the system further comprises a downstream filter positioned downstream of the accumulator and upstream of the outlet, the downstream filter configured to filter out any residual sanitizer.

9. A fluid treatment system, comprising:
a supply inlet;
a capacitive deionization (CapDI) system being operable between a purify cycle and a waste cycle, wherein:
  in the purify cycle, the CapDI system is configured to remove dissolved solids from a fluid flowing therethrough so as to provide purified fluid downstream of the CapDI system, the purified fluid comprising a residual sanitizer having chlorine and/or chloramine sanitizer, and
  in the waste cycle, the CapDI system is configured to release removed dissolved solids in the purify cycle into a waste stream;
a pump fluidly connected to and provided upstream of the CapDI system;
an accumulator fluidly connected to and provided downstream of the CapDI system, the accumulator being configured to maintain the purified fluid at desired accumulator pressure,
the pump being configured to pressurize the purified fluid during the purify cycle to maintain the desired accumulator pressure;
a downstream filter positioned downstream of the accumulator and upstream of an outlet, the downstream filter configured to filter out any residual sanitizer;
a controller electrically coupled to the CapDI system;
a first fluid inlet of the CapDI system for receiving unpurified fluid from the supply inlet and a fluid outlet for supplying purified fluid, the first fluid inlet being fluidly connected to a first flow line and a second flow line; wherein the first flow line is configured to provide fluid from the supply inlet to the first fluid inlet of the CapDI system; and the second flow line is configured to provide fluid from the supply inlet to the first fluid inlet of the CapDI system;

the first fluid inlet is configured to allow a first flow rate of unpurified fluid to the CapDI system through the first flow line and a second flow line during the purify cycle, and the first fluid inlet is configured to allow a second flow rate of fluid to the CapDI system through the first flow line and not through the second flow line during the waste cycle.

10. The fluid treatment system of claim 9, wherein a flow rate through the CapDI system in the purify cycle is about twice the flow rate of either of the first flow line or the second flow line.

11. The fluid treatment system of claim 9, further comprising
a first solenoid valve fluidly coupled to the first flow line and electrically coupled to the controller, and
a second solenoid valve fluidly coupled to the second flow line and electrically coupled to the controller.

12. The fluid treatment system of claim 11, wherein the controller is configured to:
open the second solenoid valve to fluidly connect the second flow line to the CapDI system during the waste cycle, and
open the second solenoid valve and the first solenoid valve to fluidly connect the first and second flow lines to the CapDI system during the purify cycle.

13. The fluid treatment system of claim 9, further comprising a descale line fluidly coupled to the CapDI system, the descale line adapted to remove scale formation in the CapDI system.

14. The fluid treatment system of claim 9, further comprising a pressure switch operatively connected to the accumulator and configured to maintain pressure of purified fluid to be greater than a predetermined minimum pressure and below a predetermined maximum pressure.

15. The fluid treatment system of claim 14, wherein the pressure switch is configured to communicate with the controller such that
if the pressure of the purified fluid in the accumulator is below the predetermined minimum pressure, the controller signals the system to pump purified water to further pressurize the accumulator, and
if the pressure of the purified fluid in the accumulator is at or above the predetermined maximum pressure, the controller signals the system to stop pumping purified fluid to the accumulator.

16. A fluid treatment system, comprising:
a capacitive deionization (CapDI) system for removing dissolved solids from a fluid passing therethrough to provide purified fluid to an outlet that provides purified fluid to a device that uses the purified fluid,
the CapDI system comprising a first fluid inlet for receiving fluid from a supply inlet and a fluid outlet, the fluid flowing into the first fluid inlet of the CapDI system comprising a residual sanitizer having chlorine and/or chloramine sanitizer;
a pump fluidly connected to and provided upstream of the CapDI system;
a supply inlet;
an accumulator fluidly connected to and provided downstream of the CapDI system and upstream of the device, the accumulator configured to maintain the purified fluid at a pressure greater than a predetermined minimum pressure and intermittently deliver purified fluid to the device, the purified fluid stored in the accumulator comprising the residual sanitizer so as to reduce microbial growth when stored in the accumulator;
a downstream filter positioned downstream of the accumulator and upstream of an outlet, the downstream filter configured to filter out any residual sanitizer;
a first flow line, the first flow line positioned upstream of the CapDI system and downstream of the supply inlet, the first flow line being configured to provide fluid from the supply inlet to the first fluid inlet of the CapDI system at a first flow rate;
a first valve, the first valve fluidly coupled to the first flow line and electrically coupled to the controller;
a second flow line, the second flow line positioned upstream of the CapDI system and downstream of the supply inlet, the second flow line being configured to provide fluid from the supply inlet to the first fluid inlet of the CapDI system;
a second valve, the second valve fluidly coupled to the second flow line and electrically coupled to the controller; and
the fluid treatment system is further configured to operate in a purify cycle and a waste cycle, wherein:
in the purify cycle:
keep the first valve open to provide the CapDI system with the first flow rate,
keep the second valve open to additionally provide the CapDI system with a second flow rate, and
operate the CapDI system, such that the CapDI system is configured to remove dissolved solids from the fluid flowing therethrough so as to provide the purified fluid downstream of the CapDI system; and
in the waste cycle:
keep the first valve open to provide the CapDI system with the first flow rate,
keep the second valve closed such that the CapDI system is not provided with the second flow rate, and
operate the CapDI system, such that the CapDI system is configured to remove dissolved solids from the fluid flowing therethrough so as to release removed dissolved solids from the purify cycle into a waste stream.

17. The fluid treatment system of claim 16, further comprising
one or more upstream selective filters provided upstream of the CapDI system, the upstream selective filters being configured to selectively filter out sediment from unpurified fluid flowing toward the CapDI system, the upstream selective filters being further configured to permit passage of the residual sanitizer there through.

* * * * *

UNITED STATES PATENT AND TRADEMARK OFFICE
CERTIFICATE OF CORRECTION

PATENT NO. : 10,913,669 B2  
APPLICATION NO. : 15/215273  
DATED : February 9, 2021  
INVENTOR(S) : Peter A. Voss, Michael R. Ney and Kyle D. Wood Page 1 of 1

It is certified that error appears in the above-identified patent and that said Letters Patent is hereby corrected as shown below:

On the Title Page

Column 2, item [57], Line 16, delete "and or" and insert -- and/or --

In the Claims

Column 14, Claim 17, Line 62, delete "there through" and insert -- therethrough --

Signed and Sealed this  
Twenty-seventh Day of April, 2021

Drew Hirshfeld  
*Performing the Functions and Duties of the*  
*Under Secretary of Commerce for Intellectual Property and*  
*Director of the United States Patent and Trademark Office*